Jan. 4, 1927.  J. E. MITCHELL  1,613,242
COTTON CLEANING AND RECLAIMING MACHINE
Filed April 17, 1926
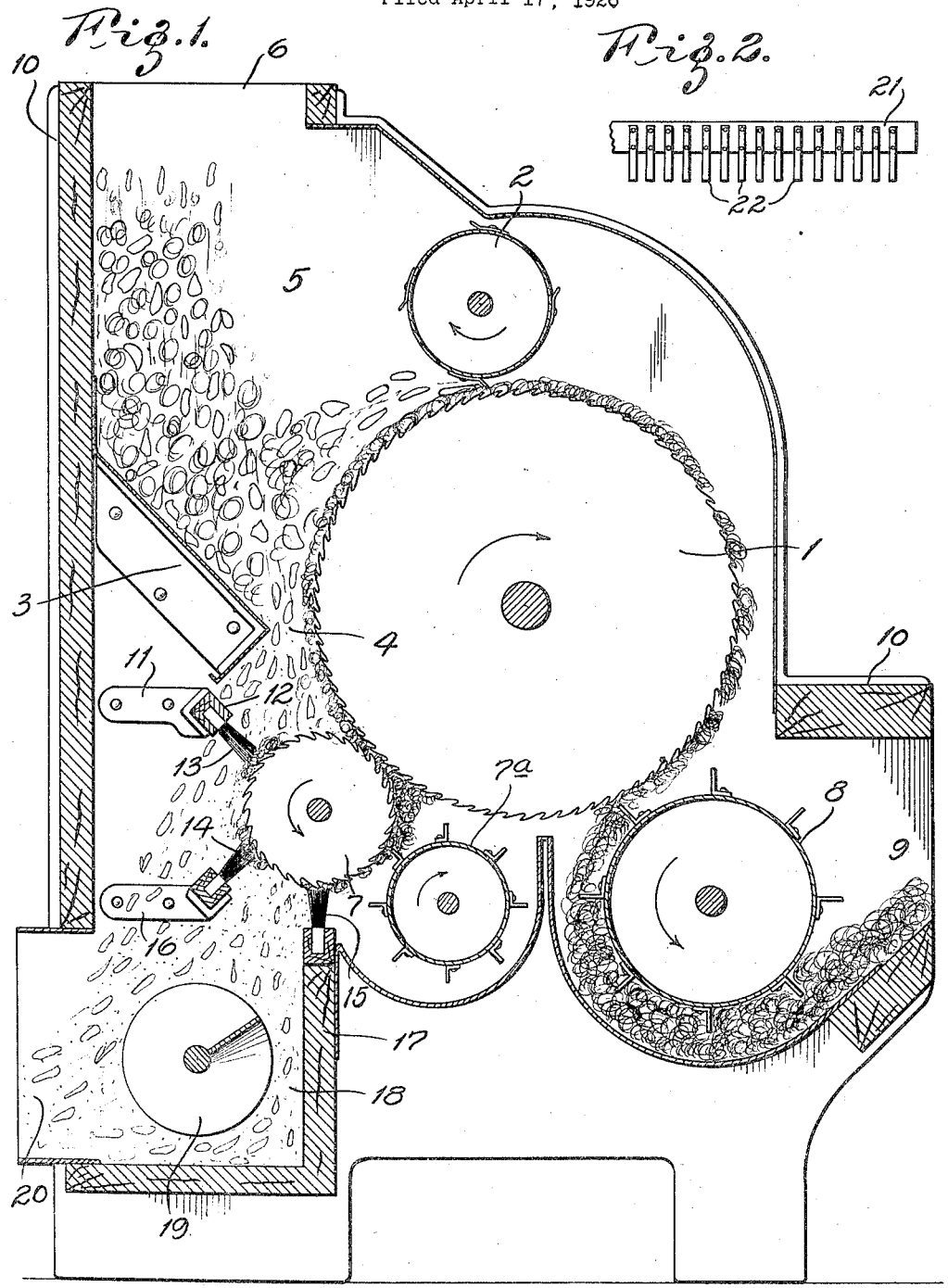
INVENTOR:
JOHN E. MITCHELL.
By Elliott & Harrington
ATTORNEYS Patented Jan. 4, 1927.

1,613,242

UNITED STATES PATENT OFFICE.

JOHN E. MITCHELL, OF ST. LOUIS, MISSOURI.

COTTON CLEANING AND RECLAIMING MACHINE.

Application filed April 17, 1926. Serial No. 102,609.

This invention has for its general object the provision of a novel machine for recovering cotton from a mass of mixed cotton and hulls and is characterized, chiefly, by the provision of two saw cylinders mounted one above the other in greater or less proximity to rotate in opposite directions, and into contact with corresponding surfaces of which the raw product successively passes, the teeth of said saw cylinders being pointed in the same direction at their point of closest approach and the two cylinders rotating in a direction to oppose the entrance of hulls in the pass or space between them.

A further characteristic feature of the invention resides in the provision of yielding means, preferably in the form of one or more brushes, located in sufficiently close proximity to the surface of the lower or reclaiming saw cylinder to force the cotton passing under such means into engagement with the teeth of said cylinder, while not exerting sufficient resistance to cause said teeth to engage or cut the hulls, thus permitting the free discharge of the latter from the surface of the saw cylinder under the force of centrifugal action.

In the preferred embodiment of the invention, the upper or main saw cylinder is of much greater diameter than the lower or reclaiming saw cylinder and has a surface speed of rotation considerably greater than that of the latter. The surfaces of the two saw cylinders may be in sufficiently close proximity to permit the teeth of the main saw cylinder to remove the cotton from the teeth of the reclaiming saw cylinder. This manner of transferring the cotton from the reclaiming saw cylinder to the main saw cylinder is not essential, however, and the space between the cylinders may even be great enough to practically prevent it. Nor is it of the essence of my invention that the cotton carried around by the reclaiming saw cylinder should be transferred, either directly or otherwise, to the main saw cylinder, although this method of recovering the reclaimed cotton is preferred. In any event, in the preferred embodiment of my invention, I employ a doffer to remove the cotton from the reclaiming saw cylinder, and, preferably, so position said doffer as to cause it to throw the removed cotton against the surface of the main saw cylinder. This doffer may act either alone or in conjunction with the main saw cylinder, in removing cotton from the reclaiming saw cylinder, according to the degree of separation between the surfaces of the two cylinders.

In a prior application, Serial No. 91,063, filed February 27th, 1926, I disclose an arrangement involving the use of a reclaiming saw cylinder rotating in the same direction as the main saw cylinder for reclaiming and carrying the cotton back to the main saw cylinder, and which depends upon the main saw cylinder to kick the hulls over the reclaiming saw cylinder through the space between the saws and the bottom of the hullboard.

While the reclaiming saw cylinder disclosed in said application is a very decided improvement over the smooth hull rollers which had previously been employed in this class of machines, and shown in various prior patents which I have obtained, there are two relatively weak points in its use; one of these is that any hulls or pieces of hulls carried through the narrow space between the two saws is cut more or less by the points of the teeth running against each other, and a percentage of the cut pieces of hulls is carried around by the main saw cylinder with the cotton. The other weak point is that the upper half of the reclaiming saw cylinder, which rotates against or toward the main working saw cylinder, tends to retard the discharge of hulls through the space between the reclaiming saw cylinder and the bottom of the hullboard. This same objection, of course, applies to a smooth roller, although not quite to the same extent. But in either case, it is necessary for the main working saw cylinder to kick or throw the hulls and other refuse over the reclaiming saw cylinder or roller.

In the present invention, I aim to overcome these disadvantages by causing the reclaiming saw cylinder to be rotated in the opposite direction to that of the main saw cylinder, so that all hulls and trash, including loose locks of cotton, which fall on the reclaiming saw cylinder, are immediately carried away from the main working saw cylinder, which prevents any congestions of hulls and trash in the space in front of the main saw cylinder beneath the hullboard. This free and continuous discharge of all extraneous matter greatly improves the separation of such matter from the cotton, since none of it is carried back by the working saw and mixed with the cotton in the working chamber of the machine.

Other features and advantages of the present invention will be more clearly understood from the detailed description of the invention to follow.

The invention is illustrated in the accompanying drawing, in which—

Figure 1 is a cross-section of a cotton cleaning machine constructed according to my invention; and Figure 2 is a view in broken elevation illustrating a modification in the character of yielding means used in connection with the reclaiming saw cylinder.

Referring to this drawing, which illustrates the essential parts of the machine, the numeral 1 indicates the main or working saw cylinder above which, as usual, is located a kicker roll 2 for knocking back hulls from the cotton carried around by the saw. At one side of the saw cylinder 1, the left side as shown in Figure 1, is located a hullboard 3, the lower end of which defines the size of a space 4 past the saw cylinder 1 for the escape of hulls from the working chamber 5, defined by the saw cylinder 1, kicker roll 2 and hullboard 3. At the top of this working chamber is an inlet 6 through which the mixed cotton and hulls are fed into the working chamber by the usual feeding means, not shown. Below and at the left of the main saw cylinder 1 is a reclaiming saw cylinder 7, the surface of which is shown to rotate in sufficiently close proximity to the surface of the saw cylinder 1 to permit the saws of the latter to remove cotton from the saws of the former, although this arrangement, as explained above, is not essential. Below and at the right of the reclaiming cylinder 7 is mounted a doffer 7ª which operates to remove cotton from said cylinder and throw it against the teeth of the main saw cylinder. Below and at the right of the saw cylinder 1 is located a doffer 8 for removing cotton from said saw cylinder and discharging it through an outlet opening 9, provided in the casing of the machine, which casing is indicated, generally, by the numeral 10. The space 4 is of sufficient width to permit the free discharge therethrough from the working chamber of hulls, trash and small locks and particles of cotton, which latter may not be engaged by the saws of the cylinder 1. The numeral 11 indicates one of two brackets secured, respectively, at opposite ends of the machine and in which is mounted at its end a bar 12 having secured therein a row of bristles, constituting a brush 13. The bar 12 extends parallel with the surface of the reclaiming saw cylinder 7 and the brush 13 is so positioned that the outer ends of the bristles will lie in sufficiently close proximity to the surface of the reclaiming saw cylinder 7 to cause all locks of cotton falling on the reclaiming saw cylinder with the hulls and other refuse falling through the space 4, to be brushed into engagement with the saw teeth. These locks of cotton, being thus firmly engaged by the teeth of the saws, are carried around and delivered back to the working saw cylinder 1, either by the doffer 7ª, or, if the cylinders are close enough, by the action of the cylinder 1 itself, which doffs or removes such locks from the reclaiming saw cylinder by reason of the fact that the peripheral speed of the saw cylinder 1 is much greater than the peripheral speed of the reclaiming saw cylinder 7. In this operation, the bristles of the brush 13 yield sufficiently to prevent the teeth of the saws from engaging or cutting the hulls, so that the hulls are thrown off of the saw cylinder 7 after passing beneath said brush, while the cotton will be carried around by the saw cylinder, as stated above.

Ordinarily, a single brush or row of bristles 13 will answer the purpose of causing all the cotton to be engaged by the reclaiming saw cylinder, but in the interest of making a very close separation between the cotton and hulls falling on the said reclaiming saw cylinder, I prefer to employ additional brushes, or rows of bristles, such as indicated at 14 and 15, the brush 14 being mounted in brackets 16 in a manner similar to the brush 13, and the brush 15 being mounted on a vertical frame member 17 of the machine. This, as stated, insures a very close separation, so that practically no hull particles will be carried past the brush 15. The hulls and trash falling past the reclaiming saw cylinder 7 fall into a chamber 18 containing a worm conveyor 19, which continuously discharges this refuse through an opening 20 in the casing of the machine.

In operation, the mixed cotton and hulls are fed into the working chamber 5 and slide down the hullboard 3 into contact with the main working saw cylinder 1, which rotates in the direction shown by the arrow, and the cotton engaged by the teeth of the saws of said cylinder is carried around beneath the rotating kicker roll 2 to the doffer 8, which removes the cotton from the cylinder 1 and discharges same through the opening 9. The hulls separated from the cotton by the kicker roll 2 are thrown back onto the hullboard 3, whence they slide, with other loose hulls and trash, through the discharge space 4, past the saw cylinder 1. These hulls and trash, together with a small percentage of cotton in the form of small separated locks, fall onto the reclaiming saw cylinder 7, which rotates in the direction shown by the arrow, and which carries the hulls and trash, with the loose locks of cotton, in a continuous uniform stream beneath the brush 13, and in a direction away from the pass between the saw cylinders. The cotton locks are forced into engagement with the teeth of the saw cylinder 7 by the action of the bristles of said brush, while the hulls are thrown off by centrifugal action. If the additional brushes 14 and 15 are employed, the same action is repeated, these brushes preventing small locks of cotton being thrown off by centrifugal action. The cotton carried around by the saw cylinder 7 is continuously removed therefrom either by the saw cylinder 1 or by the doffer 7ª, or by both such means.

In making the space between the bristles of the brush 13 and the teeth of the saw cylinder 1 narrow enough to insure engagement of all locks of cotton by the saws, it becomes necessary for the teeth of the saws to pull the larger hulls through the space by causing the bristles to bend or yield. The force necessary to do this, however, is not great enough to cause the teeth of the saws to cut or firmly engage the hulls, so that after passing under the brush, the hulls and trash are readily thrown off of the saw cylinder.

While, as stated, the single brush 13 will, in most cases, reclaim all cotton of value that might be discharged with the hulls through the opening 4, in some instances there are a few hard locks of cotton with weak fibre which, although firmly engaged by the saw teeth, while being pulled through the space beneath the brush 13, may be thrown off by centrifugal force before being carried around to the saw cylinder 1. By mounting the brush 14 as shown and, if necessary, the brush 15, such locks of cotton do not have time to fly off of the saw cylinder 7 before they are re-engaged by the next brush. In other words, while such locks of cotton might be thrown off by centrifugal force while being carried by the reclaiming saw from the brush 13 to the brush 15, the brush 14 would prevent this. At the same time, these extra brushes do not interfere in any way with the discharging of the hulls and other extraneous matter which has not been driven onto and engaged by the teeth of the saws of cylinder 7.

It should be emphasized that my invention contemplates the use of a brush, or of brushes, such as described, only in connection with the reclaiming saw cylinder of a machine of the type herein described. The use of such a brush in connection with the main saw cylinder would have no advantage whatever, and, in fact, would be wholly impracticable, for the reason that this saw cylinder operates on the bulk of cotton having hulls entangled therewith, with the result that both the hulls and cotton would be carried by the saw under such brush and no separation of the hulls from the cotton would follow. The reclaiming saw, however, only operates upon small locks of cotton and hulls which have been already detached from the large mass of cotton by the action of the main saw cylinder and the kicker roll co-operating therewith, with the result that the cotton can be readily carried under the brush by the reclaiming saw and be forced by the brush into engagement with the teeth of the saw, and the hulls can readily pass under the brush and be thrown off from the saw cylinder by centrifugal action. As there is relatively only a small amount of cotton to be acted upon by the reclaiming saw cylinder, and this, usually in the form of small loose locks, it will be readily apparent that there is practically no tendency for the hulls passing under the brushes to adhere to the cotton, and, as stated, in operation, the cotton will be engaged by the saw teeth of the reclaiming saws, while the hulls passing under the brush, or brushes, will be thrown off. Thus, when used with the reclaiming saw cylinder, these brushes operate to effect a separation between the cotton and the hulls. In the case of the main saw cylinder, such action could not occur, because of the bulk of cotton treated and the fact that the hulls are so entangled therewith that both the hulls and cotton would pass under the brushes in bulk form with no resultant separation.

While I have referred to the use of a brush or brushes formed of rows of bristles, to co-operate with the reclaiming saw cylinder, I wish it understood that other yielding means could be employed, such, for example, as rows of steel fingers. Such a construction is illustrated in Figure 2, in which a bar 21, corresponding to the bar 12, has secured on one side a row of spring fingers 22. When the bar 21 is positioned in the brackets 11, the spring fingers will operate in much the same manner as the bristles 13. However, I have found bristles to be more effective in operation.

I wish it further to be understood that while I prefer to provide the reclaiming member 7 in the form of a saw cylinder, said reclaiming member could have a cotton-engaging surface formed otherwise than by means of saw teeth.

I claim:

1. A cotton cleaning machine, comprising a saw cylinder, a rotary cotton engaging member, means for feeding mixed cotton and hulls into contact with the surface of said saw cylinder, and the detached hulls and locks of cotton escaping past the latter into engagement with the surface of said rotary cotton engaging member, a kicker roll and a doffer co-operating with said saw cylinder, a series of yielding members co-operating with said rotary cotton engaging member and beneath which cotton engaged by the latter is carried, and means for continuously removing cotton carried around by said rotary member therefrom.

2. A cotton cleaning machine, comprising a main saw cylinder, a reclaiming saw cylinder, means for feeding mixed cotton and hulls into contact with the surface of said main cylinder, and the detached hulls and locks of cotton escaping past the latter into engagement with the surface of said reclaiming saw cylinder, a kicker roll and a doffer cooperating with said saw cylinder, a series of yielding members co-operating with said reclaiming saw cylinder and beneath which cotton engaged by the latter is carried, and means for continuously removing cotton carried around by said reclaiming saw cylinder therefrom.

3. A cotton cleaning machine, comprising a main saw cylinder, a reclaiming saw cylinder, means for feeding mixed cotton and hulls into contact with the surface of said main saw cylinder, and the detached hulls and locks of cotton escaping past the latter into engagement with the surface of said reclaiming saw cylinder, a kicker roll and a doffer co-operating with said main saw cylinder, a row of bristles constituting a brush co-operating with said reclaiming saw cylinder and beneath which cotton engaged by the latter is carried, and means for continuously removing cotton from said reclaiming saw cylinder.

4. A cotton cleaning machine, comprising a main saw cylinder, a reclaiming saw cylinder, means for feeding mixed cotton and hulls into contact with the surface of said main saw cylinder, and the detached hulls and locks of cotton escaping past the latter into engagement with the surface of said reclaiming saw cylinder, a kicker roll and a doffer co-operating with said main saw cylinder, a series of yielding members co-operating with said reclaiming saw cylinder and beneath which cotton engaged by the latter is carried, and means for continuously transferring cotton carried around by said reclaiming saw cylinder to the teeth of said main saw cylinder.

5. A cotton cleaning machine, comprising a main saw cylinder, a reclaiming saw cylinder, means for feeding mixed cotton and hulls into contact with the surface of said main saw cylinder, and the detached hulls and locks of cotton escaping past the latter into engagement with the surface of said reclaiming saw cylinder, a kicker roll and a doffer co-operating with said main saw cylinder, a series of yielding members co-operating with said reclaiming saw cylinder and beneath which cotton engaged by the latter is carried, and a doffer co-operating with said reclaiming saw cylinder.

6. A cotton cleaning machine, comprising a main saw cylinder, a reclaiming saw cylinder located in juxtaposition to the main saw cylinder and mounted to rotate in a direction to oppose the entrance of hulls into the pass between the two saw cylinders, means for feeding mixed cotton and hulls into contact with the surface of said main saw cylinder, and the detached hulls and locks of cotton escaping past the latter into engagement with the surface of said reclaiming saw cylinder, a kicker roll and a doffer co-operating with said main saw cylinder, and means for continuously removing cotton carried around by said reclaiming saw cylinder therefrom.

7. A cotton cleaning machine, comprising a main saw cylinder, a reclaiming saw cylinder, means for feeding mixed cotton and hulls into contact with the surface of said main saw cylinder, and the detached hulls and locks of cotton escaping past the latter into engagement with the surface of said reclaiming saw cylinder, a kicker roll and a doffer co-operating with said main saw cylinder, a row of yielding members co-operating with said reclaiming saw cylinder and beneath which cotton engaged by the latter is carried, and a doffer co-operating with said reclaiming saw cylinder and positioned to propel cotton removed from the latter into engagement with the teeth of said main saw cylinder.

8. A cotton cleaning machine, comprising a main saw cylinder, a reclaiming saw cylinder located in co-operative relation therewith, means for feeding mixed cotton and hulls into contact with the surface of said saw cylinder, and the detached hulls and locks of cotton escaping past the latter into engagement with the surface of said reclaiming saw cylinder, the two saw cylinders rotating in a direction to oppose the entrance of hulls into the space between them, a kicker roll and a doffer co-operating with said main saw cylinder, and means for continuously removing cotton carried around by said reclaiming saw cylinder therefrom.

9. A cotton cleaning machine, comprising a main saw cylinder, a reclaiming saw cylinder located in co-operative relation therewith, means for feeding mixed cotton and hulls into contact with the surface of said main saw cylinder, and the detached hulls and locks of cotton escaping past the latter into engagement with the surface of said reclaiming saw cylinder, the two saw cylinders rotating in a direction to oppose the entrance of hulls into the space between them, a kicker roll and a doffer co-operating with said main saw cylinder, a row of yielding members co-operating with said reclaiming saw cylinder and beneath which cotton engaged by the latter is carried, and means for continuously removing cotton from said reclaiming saw cylinder.

10. A cotton cleaning machine, comprising a main saw cylinder operating in a working chamber adapted to be supplied with mixed cotton and hulls and providing a discharge outlet for detached hulls and locks of cotton past said saw cylinder, a reclaiming saw cylinder located adjacent to the main saw cylinder under said discharge opening and mounted to rotate in a direction to oppose the entrance of hulls into the pass between the saw cylinders, means for continuously transferring cotton carried around by the reclaiming saw cylinder to the teeth of the main saw cylinder, and means for continuously removing cotton from the main saw cylinder.

11. A cotton cleaning machine, comprising a main saw cylinder operating in a working chamber adapted to be supplied with mixed cotton and hulls and providing a discharge outlet for detached hulls and locks of cotton past said saw cylinder, a reclaiming saw cylinder located adjacent to the main saw cylinder under said discharge opening, said cylinders being mounted to rotate in a direction to oppose the entrance of hulls into the pass between them, means for recovering the cotton carried around by said reclaiming saw cylinder therefrom, and means for continuously removing the cotton from said main saw cylinder.

12. A cotton cleaning machine, comprising a main saw cylinder, a reclaiming saw cylinder located adjacent to the main saw cylinder, means for feeding mixed cotton and hulls into contact with the surface of said main saw cylinder, and the detached hulls and locks of cotton escaping past the latter into engagement with the surface of said reclaiming saw cylinder, the two saw cylinders rotating in a direction to oppose the entrance of hulls into the pass between them, and the main saw cylinder having a greater peripheral speed than the reclaiming saw cylinder, means for continuously transferring cotton carried around by the reclaiming saw cylinder to the teeth of the main saw cylinder, and means for continuously removing cotton from the main saw cylinder.

13. A cotton cleaning machine, comprising a main saw cylinder, a reclaiming saw cylinder located adjacent thereto, the teeth of the two saw cylinders extending in the same direction at the point of closest approach of the cylinders, means for feeding mixed cotton and hulls into contact with the surface of the main saw cylinder, and the detached hulls and locks of cotton escaping past the latter into engagement with the surface of said reclaiming saw cylinder, the two saw cylinders rotating in a direction to oppose the entrance of hulls into the pass between them, means for continuously transferring cotton carried around by the reclaiming saw cylinder to the teeth of the main saw cylinder, and means for continuously removing cotton from the main saw cylinder.

14. A cotton cleaning machine, comprising a main saw cylinder, a reclaiming saw cylinder, means for feeding mixed cotton and hulls into contact with the surface of said main saw cylinder, and the detached hulls and locks of cotton escaping past the latter into engagement with the surface of said reclaiming saw cylinder, a kicker roll and a doffer co-operating with said main saw cylinder, a series of rows of yielding members co-operating with said reclaiming saw cylinder at separated positions relative to the periphery thereof and beneath which cotton engaged by the reclaiming saw cylinder is carried in succession, and means for continuously removing cotton from said reclaiming saw cylinder.

15. A cotton cleaning machine, comprising a main saw cylinder operating in a working chamber adapted to be supplied with mixed cotton and hulls and providing a discharge outlet for detached hulls and locks of cotton past said saw cylinder, a kicker roll co-operating with said main saw cylinder in said working chamber, a reclaiming saw cylinder of less diameter and having a less peripheral speed than the main saw cylinder, located in juxtaposition to the main saw cylinder under said discharge opening, said saw cylinder being mounted to rotate in a direction to oppose the entrance of hulls into the pass between them, and the teeth thereof projecting in the same direction at the point of closest approach of the two cylinders, a brush mounted in proximity to the surface of the reclaiming saw cylinder and operating to force cotton passing under the same into engagement with the teeth of said reclaiming saw cylinder, a doffer co-operating with said saw cylinder, and means for continuously recovering cotton from said reclaiming cylinder.

In testimony whereof, I have hereunto set my hand.

JOHN E. MITCHELL.